United States Patent [19]

Mase et al.

[11] Patent Number: 4,740,838
[45] Date of Patent: Apr. 26, 1988

[54] APPARATUS FOR SUPERIMPOSING A DISPLAY OF DETECTED DATA FOR A VEHICLE

[75] Inventors: Yamato Mase, Handa; Masami Ishii; Shuji Noda, both of Toyota; Yoshihiro Naruse, Tokyo; Hiroshi Takeshita, Okazaki; Shinobu Nagata, Chiryu, all of Japan

[73] Assignee: Aisin Seiki Kabushiki Kaisha, Kariya, Japan

[21] Appl. No.: 937,897

[22] Filed: Dec. 4, 1986

[30] Foreign Application Priority Data

Dec. 4, 1985 [JP] Japan ................................ 60-274135

[51] Int. Cl.$^4$ .............................................. H04N 7/18
[52] U.S. Cl. ..................................... 358/103; 358/228
[58] Field of Search ................... 358/103, 22, 183, 32, 358/228, 211, 229, 108, 93

[56] References Cited

U.S. PATENT DOCUMENTS

4,120,004 10/1978 Coutta ............................. 358/228 X
4,558,368 12/1985 Aoki et al. ........................... 358/228
4,651,226 3/1987 Motoori et al. ................. 358/228 X Primary Examiner—Howard W. Britton
Assistant Examiner—Victor R. Kostak
Attorney, Agent, or Firm—Oblon, Fisher, Spivak, McClelland & Maier

[57] ABSTRACT

An apparatus for superimposing a display image of vehicle data or position data of the vehicle on video signals of the surroundings of the vehicle. An object picked up is converted into video signals by an image pick-up camera having an image pick-up drive circuit, an amplifier circuit, a wave shaping circuit, a non-linear amplifier circuit, and a diaphragm control circuit. The video signals are gamma corrected in the non-linear amplifier circuit. Superimposed video signals are read from a memory of stored characters, figures or the like and synchronizing signals are mixed into composite video signals. The composite video signals are superimposed with pattern signals, graphic signals, character signals or the like and displayed by using a liquid crystal or a CRT.

5 Claims, 3 Drawing Sheets

APPARATUS FOR SUPERIMPOSING A DISPLAY OF DETECTED DATA FOR A VEHICLE

BACKGROUND OF THE INVENTION

1. Field of the Invention

The present invention relates to display apparatuses to be used as steering auxiliary data source of vehicles for a driver, and more particularly to a vehicle display apparatus wherein image display is performed in superimpose of vehicle data, position data of vehicle or the like on video signals taking surroundings of the vehicle. The invention can be used in an apparatus installed in automobiles wherein a dead angle at surroundings of a vehicle is image-displayed, detection data of various sensors such as distance data between a vehicle and an obstacle and between a vehicle and a man are image-displayed in superimpose, or at ordinary running state various supervisory data of the vehicle are image-displayed in superimpose.

2. Prior Art

In a display apparatus of the prior art, when decomposition scanning is performed by an image pickup means such as television camera to perform photoelectric conversion, horizontal synchronizing signal and vertical synchronizing signal are overlaid on video signals, and composite scanning is performed by a CRT (cathode-ray tube) for display using the synchronizing signals, and at the composite scanning of the video signals obtained by the image pickup means, the video signals transmitted from an image memory circuit storing video signals such as pattern display, graphic display, character display are superposed. The video signals transmitted from the image memory circuit are superposed with the synchronizing signals when the display signals are read from the image memory circuit, and synchronous lead-in is performed so that the synchronizing signals of the image memory circuit is coincident with the synchronizing signal of the video signal, and then mixing of both video signals are performed.

That is, in the display apparatus of the prior art, the synchronizing signal of the video signal obtained by the image pickup means and the synchronizing signal of the video signal transmitted from the image memory circuit are caught at an image receiver side, and both are led in synchronizing state, and the video signal transmitted from the image memory circuit is superposed on the video signal obtained by the image pickup means.

In such display apparatus of the prior art, since both the image pickup means and the image memory circuit are provided with video synchronizing signal generating circuit, in order that such display apparatus of the prior art is made compact to be installed in vehicle bodies, there exists a problem.

Further, in automobiles, since possibility is high in invasion of noise in wide frequency range from medium frequency band up to UHF band by an ignition circuit, a flasher, a wiper, a horn or the like, if the video signal and the pattern signal have synchronizing signals independently, noise overlaid on one signal causes disturbance in synchronization and viewing of the display screen becomes difficult in the image display.

SUMMARY OF THE INVENTION

Accordingly, an object of the present invention is to provide a vehicle display apparatus which can be made compact easily and is high in anti-noise property.

A vehicle display apparatus according to the present invention comprises an image pickup means for converting an object picked-up into video signals, a diaphragm control circuit for controlling diaphragm of the image pickup means corresponding to video output state of the image pickup means, a diaphragm drive circuit and a diaphragm opening setting means for adjusting the diaphragm opening corresponding to output of the diaphragm control circuit, a non-linear amplifier circuit for performing gamma correction of output of the image pickup means after amplifying and wave shaping, an image memory circuit for outputting video signals of a superimposed object stored in a memory, a control signal generating circuit for generating scanning signals of the image pickup means, scanning signals of the image memory circuit, and synchronizing signals superposed on outputs of the non-linear amplifier circuit and the image memory circuit, a mixing circuit for superposing outputs of the image memory circuit and synchronizing signal output of the control signal generating circuit on output of the non-linear amplifier circuit into composite video signals, and a display means for displaying the composite video signals transmitted from the mixing circuit.

In the invention, an object picked-up is converted into video signals by the image pickup means, the converted video signals are shaped in waveform by a wave shaping circuit and then led to a non-linear amplifier circuit, gamma correction is performed so that contact of the video signals is not saturated, and the output of the non-linear amplifier circuit is inputted in a mixing circuit. In the mixing circuit, the video signal of the non-linear amplifier circuit and video signal read from a memory for video signal of superimpose object, to store characters, figures or the like, and the synchronizing signal are mixed into composite video signal. The composite video signal is made input of a receiver having a display means, and pattern signals, graphic signals, character signals or the like are superposed on the image of object picked-up and displayed by the display means.

Accordingly, the image pickup means and the image memory circuit need not be provided with synchronizing signal generating circuit independently but common use of the synchronizing signal generating circuit is possible, whereby the apparatus becomes compact and the anti-noise property becomes high by the common use of the synchronizing signal generator.

BRIEF DESCRIPTION OF THE DRAWINGS

A more complete appreciation of the invention and many of the attend advantages thereof will be readily obtained as the same becomes better understood with reference to the following detailed description when considered in connection with the accompanying drawings wherein.

DETAILED DESCRIPTION OF THE PREFERRED EMBODIMENT

Figure 1:
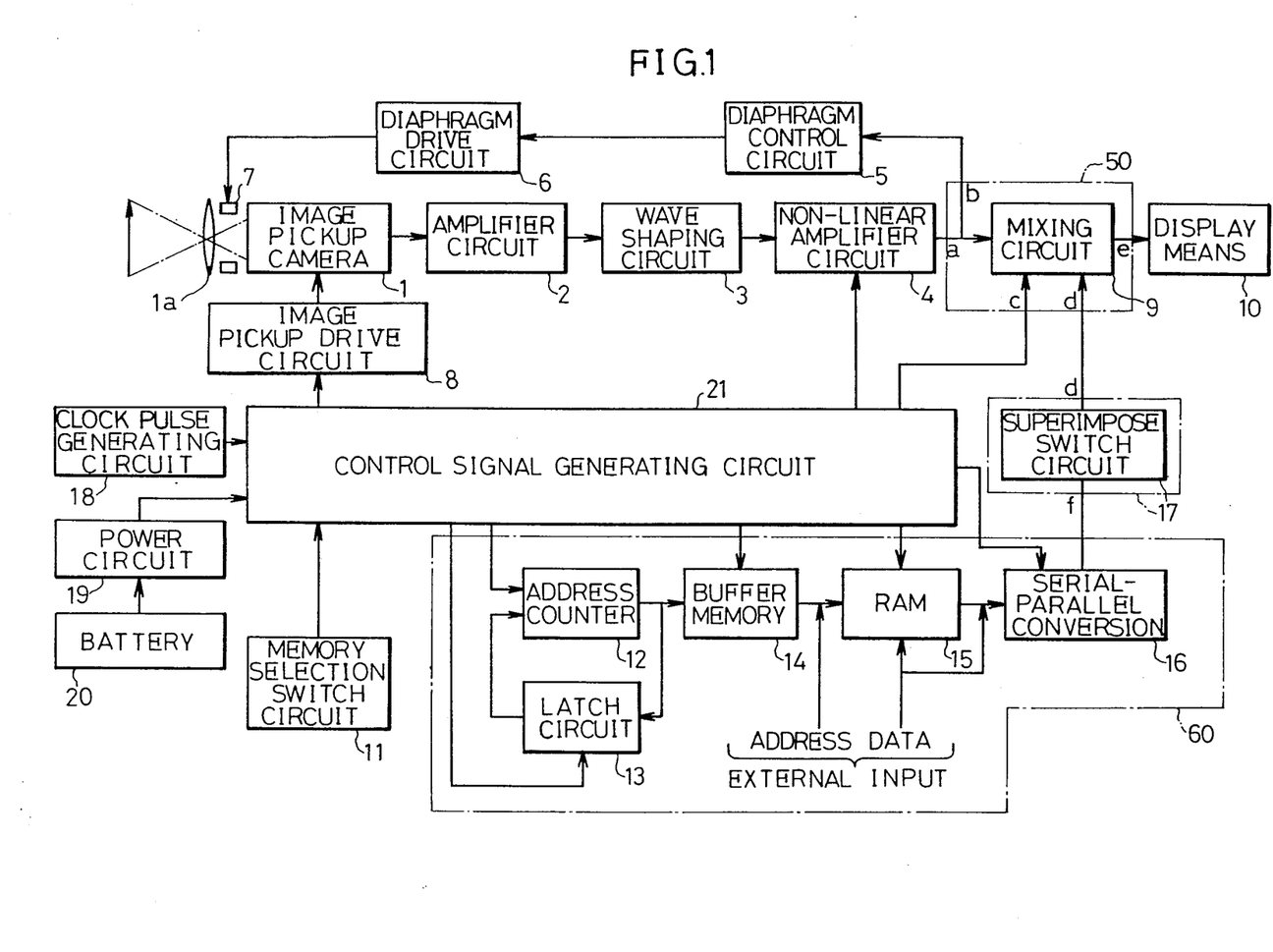
FIG. 1 is a whole constitution diagram illustrating an embodiment of a vehicle display apparatus of the present invention.

FIG. 1 is a whole constitution diagram of a vehicle display apparatus as an embodiment of the present invention.

An image pickup camera 1 as known as for example a television camera comprises an image pickup means for converting an object picked-up into video signals, an optical lens 1a and a diaphragm opening setting means 7 for controlling the light quantity. The image pickup means is know as an image pickup tube scanned by an image pickup drive circuit 8 and as solid state pickup conversion devices such as MOS image sensor and CCD image sensor. An amplifier circuit 2 amplifies video output being output of the image pickup camera 1. A wave shaping circuit 3 removes high-frequency components of the video signal which is subjected to photo-electric conversion by the image pickup camera 1 and amplified by the amplifier circuit 2, and performs the wave shaping into video signal level per picture element. Output of the waves shaping circuit 3 is led in a non-linear amplifier circuit 4, where difficulty of viewing the display image because of generating of video signal with extreme contrast such as halation is prevented and the large output of the wave shaping circuit 3 is controlled whereby the display image can be viewed easily and the gamma correction is performed by the non-linear amplifier circuit. Output of the non-linear amplifier circuit 4 is led to a diaphragm control circuit 5, and in order to adjust the contrast of the video output after the gamma correction the light quantity coming to the image pickup camera 1 is adjusted by a diaphragm opening setting means through a diaphragm drive circuit 6.

Since the image pickup camera 1 and the image pickup drive circuit 8 for scanning the image pickup camera 1, the amplifier circuit 2, the wave shaping circuit 3, and the non-linear amplifier circuit 4 are known and included in constitution of image pickup cammera in usual, the description shall be simplified. Constitution that output of the non-linear amplifier circuit 4 is fed back to the diaphragm control circuit 5, the diaphragm drive circuit 6 and the diaphragm opening setting means 7 for adjusting the diaphragm opening and therefore the diaphragm state of the image pickup camera 1 is adjusted by the video output state, is also known in automatic diaphragm method or the like.

A mixing circuit 9 superposes video signal output as superimpose object and synchronizing signal output on video signal output of the non-linear amplifier circuit 4.

A display means 10 displays the image by combination scanning of video signals using known liquid crystal or CRT.

A memory selective switch circuit 11 is connected to input port of a control signal generating circuit 21, and selects kind of clock pulses inputted to an address counter 12, a latch circuit 13 and a buffer memory 14. The memory selective switch circuit 11 performs the read address assignment of a RAM 15, and selects kind of clock pulses corresponding to kind of sensor and output of sensor.

The address counter 12 assigns data store address of the RAM 15, and the latch circuit 13 holds the value of the address counter 12 for a prescribed time. The buffer memory 14 is an address buffer which temporarily holds the value of the address counter 12 and uses it for reading of the RAM, and output side of the address buffer is connected to address bus. Use of such address buffer is the same as that of known address buffer to be used for transfer of address. The RAM 15 memorizes digital approximate signal storing data being coincident with the picture element in the data memory of eight bits (contact of eight bits without digital weighting) in address assigned at the address counter 12. The data memory can be memorized by external input. Output of the RAM 15 becomes input of a serial-parallel conversion circuit 16. Data read by address assignment of the RAM 15 is parallel signals of eight bits and therefore made series signals of eight bits, and picture elements of $8 \times 64$ superposed on one scanning line are transmitted to a superimpose switch circuit 17. Such serial-parallel conversion circuit 16 is known circuit as a code conversion circuit.

The RAM 15, the address counter 12 performing address assignment of the RAM 15, the latch circuit 13, the buffer memory 14, and the serial-parallel conversion circuit 16 for converting parallel signals of the RAM 15 into series signals constitute an image memory circuit 60.

A superimpose switch circuit 17 has a superimpose selection switch SW (refer to FIG. 2) for selecting whether or not the pattern display signal, the graphic display signal and the character display signal as superimpose object must be superposed on the video signal obtained by the image pickup camera in the superimpose. If the superimpose is not required, output of the serial-parallel conversion circuit 16 is dropped to the earth side by the superimpose selection switch SW.

A clock pulse generating circuit 18 in frequency dividing or delay if required becomes drive source of a control signal generating circuit 21 for generating scanning signal of the image pickup camera 1, synchronizing signal of video signal, clock pulses of the address counter 12, and timing pulses for the latch circuit 13, the buffer memory 4, the RAM 15 and the serial-parallel conversion circuit 16. A power circuit 19 supplies power-supply voltage of a battery 20 through voltage stabilizer circuit to the control signal generating circuit 21 and each component of the embodiment. Since the clock pulse generating circuit 18, the power circuit 19 and the battery 20 are known, the description shall be omitted.

Further, constitution of main part of the vehicle display apparatus of the present invention will be described in detail referring to FIG. 2 and FIG. 3.

Figure 2:
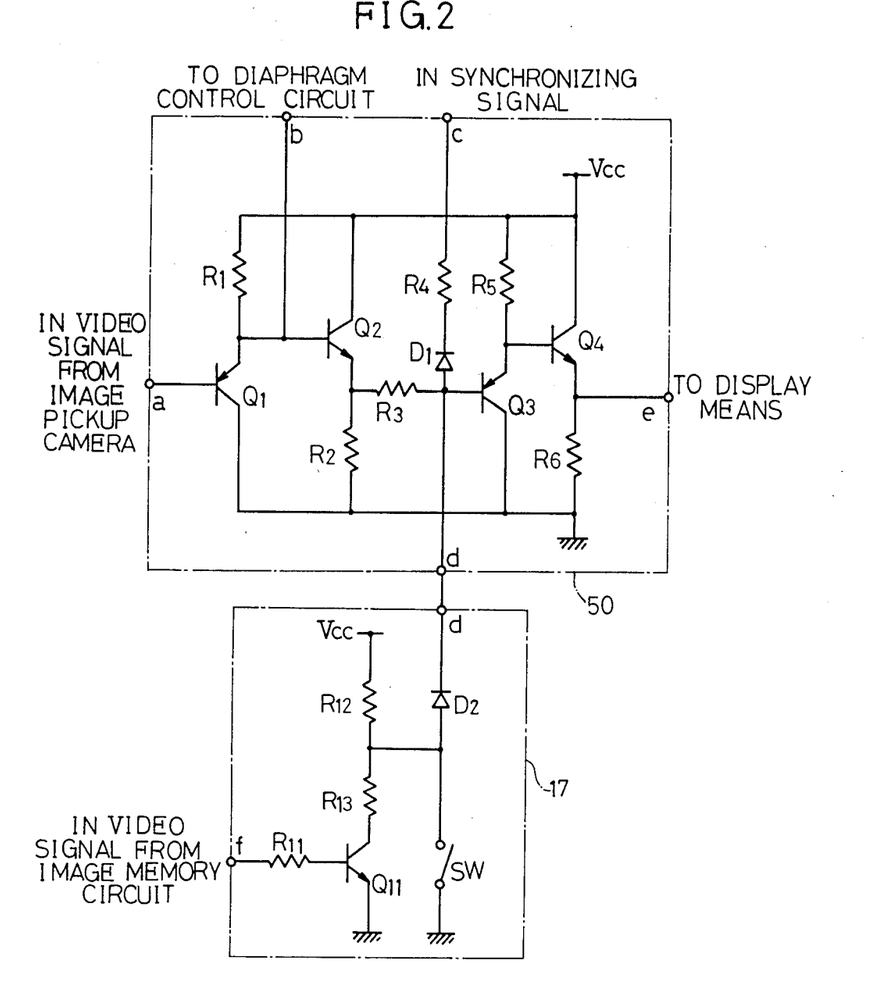
FIG. 2 is a circuit diagram illustrating a concrete circuit example of a circuit including a mixing circuit of the embodiment as main part and a superimpose switch circuit.

FIG. 2 shows a concrete circuit example of a circuit 50 containing the mixing circuit 9 as main part and the superimpose switch circuit 17.

In FIG. 2, video signal from the image pickup camera through the amplifier circuit 2, the wave shaping circuit 3 and the non-linear amplifier circuit 4, and then is led to terminal "a". The video signal inputted to the terminal "a" is amplified by grounded collector transistor Q1, and voltage drop of a resistor R1 becomes input of transistor Q2 to constitute emitter follower. The video signal inputted to the transistor Q2 becomes input of transistor Q3 to constitute grounded collector circuit with voltage across a resistor R2 through a resistor R3, and output of the transistor Q3 becomes voltage drop of a resistor R5 and is made input of transistor Q4 to constitute emitter follow, and output of the transistor Q4 is taken out of a resistor R6. Terminal "e" becomes input of the display means 10. Then the transistor Q1 and the resistor R1 to constitute the grounded collector circuit, and the transistor Q2 and the resistor R2 to constitute the emitter follower, as well as the transistor Q3 and the resistor R5 to constitute the grounded collector circuit, and the transistor Q4 and the resistor R6 to constitute the emitter follower, act as a buffer circuit to the video signal from the image pickup camera 1, the synchronizing signal and the video signal from the image memory circuit.

Amplified output of the grounded collector circuit composed of the transistor Q1 and the resistor R1 becomes input of the diaphragm control circuit 5 through terminal "b", and is fed back to the diaphragm drive circuit 6 and the diaphragm opening setting means 7 adjusting the diaphragm opening so as to adjust the diaphragm state of the image pickup camera 1 according to the video output state.

Terminal "c" is led to the control signal generating circuit 21. When the synchronzing signal input is "L", it is drawn to low potential side through a resistor R4 and diode D1 whereby the synchronizing signal is superposed on the low potential side of the video signal inputted to the terminal "a".

Output signal of the superimpose switch circuit 17 is inputted to terminal "d", and the video signals from the image memory circuit are inputted as "H (high level)", "L (low level)" signals to terminal "f" of the superimpose switch circuit 17. When the "H" signal is inputted to the terminal "f", base current flows through a resistor R11 into transistor Q11 which is turned on thereby, and then node potential between series resistors R12 and R13 is inputted to the transistor Q3. This value is made less than the low level of the video signal. When the "L" signal is inputted to the terminal "f", the transistor Q11 is turned off whereby the input potential of the transistor Q3 is raised through the resistor R12 and diode D2.

Thus signal level of the video signal inputted to the resistor Q3 is raised. That is, when an ordinary CRT is used as display means, the video signal from the image memory circuit is superimposed at white level. In this case, if the superimposed selection switch SW is turned on, since anode side of the diode D2 becomes the earth potential and the diode D becomes reverse bias state, the superimpose function does not act irrespective of input of the transistor Q11.

Figure 3:
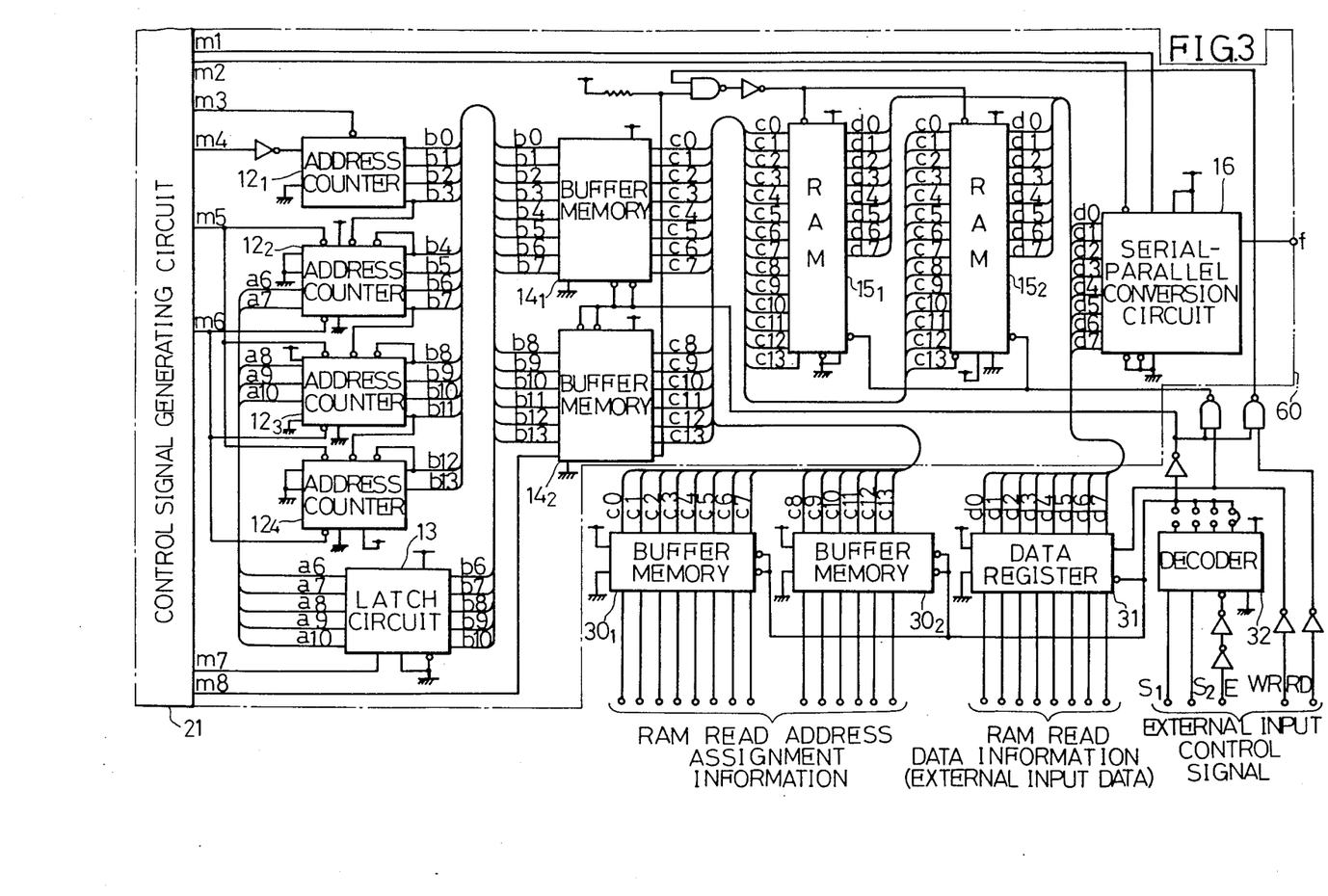
FIG. 3 is a circuit diagram illustrating a detailed circuit example of an image memory circuit of the embodiment.

FIG. 3 shows a concrete circuit example of the image memory circuit 60.

In FIG. 3, the address counter 12 comprises four counters $12_1 \sim 12_4$ of four bits, and fundamentally constitute binary-coded $2^n$ counter. Clock pulse m3 is inputted to the counter $12_1$ and performs count-up, whereby outputs of the four counters $12_1 \sim 12_4$ to constitute the address counter 12 are inputted to buffer memories $14_1$ and $14_2$. Content inputted to the buffer memories $14_1$ and $14_2$ to assign address of two RAM $15_1$ and RAM $15_2$ are inputted to the RAM $15_1$ and $15_2$ through the address bus. Changing of the RAM $15_1$ and $15_2$ is performed by the most significant bit of the address counter 12. According to the address assignment of the RAM $15_1$ and $15_2$, data are loaded to the serial-parallel conversion circuit 16 of eight bits by timing pulse m2, and parallel data of eight bits are outputted in series in sequence by clock pulse m1.

. That is, the timing pulse m2 loads data of the RAM $15_1$ or $15_2$ one time per every eight pulses of the clock pulse m1, whereby the address assignment of the RAM $15_1$ and $15_2$ has the same period as that of the timing pulse m2, and the clock pulse m3 of the address counter $12_1$ has frequency of $\frac{1}{8}$ of that of the clock pulse m1.

Data read from the RAM are outputted in picture element unit of eight bits, and the picture element number of the effective screen width in one scanning line is set to 512 and data of eight bits in one scanning line from address No. 0 through No. 63 are superposed on the video signals obtained at side of the image pickup camera 1. The scanning line number of the effective field height is set to 244, and the scanning line number of the video signals obtained at side of the image pickup camera 1 in bits beyond the 16th bit of the address counter $12_2$ is assigned. Consequently, when scanning of the effective field height is finished, the counter is cleared by clear pulses m4 and m5. Thus data of eight bits are read, data from address No. 0 through No. 63 are superposed in one scanning line, and data from address No. 64 through No. 125 are superposed in the next scanning line repeatedly, whereby the picture element memorized per bit of each data can be superimposed on the display means.

When figure form such as character is superimposed, however, many memories need not always be used to read the content, but data collected in a memory of specific address are read repeatedly in the prescribed number, and the read data are superposed on the scanning line of the video signals obtained at side of the image pickup camera 1, and the data in the same address assignment are overlaid on the scanning line plural times whereby the superimpose can be performed.

That is, after count-up is performed from address No. 0 through No. 63 by the clock pulse m3, output state of outputs $b_6 \sim b_{10}$ of the address counter $12_2$ and $12_3$ in the scanning line unit is latched by the latch circuit 13, and the same address is assigned repeatedly. In this embodiment, since through signal m6 is generated so that the same address is assigned 10 times, data of the 10 scanning lines can be superposed by the through signal m6 of 10 times, whereby the number of memories in the RAM 15 may be decreased when figure form such as character is superimposed.

Writing to the RAM $15_1$ and $15_2$ can be performed as follows:

Digital value in inputted to input at side of the RAM write address assignment information, and image to be superimposed is inputted in decomposition to input at side of the RAM write data information. The address assignment information inputted to side of the RAM write address assignment information is connected through the buffer memories $30_1$ and $30_2$ to the address bus of the RAM $15_1$ and $15_2$. The RAM write data information is connected through the data register 31 to the data bus of the RAM $15_1$ and $15_2$. External input control signals are made the read timing signal of the buffer memories $30_1$ and $30_2$ and the read timing signal of the data register 31 through the decoder 32. That is, when "H" are inputted to select inputs $S_1$ and $S_2$ of the external input control signals and "L" is inputted to enable input E, the RAM write address assignment information can be led through the buffer memories $30_1$ and $30_2$ to the address bus, and the RAM write data information can be led through the data register 31 to the data bus. At the same time, the buffer memories $14_1$ and $14_2$ are released from the address bus. Then, the terminal WR is made "L" by the external input control signal, the RAM $15_1$ and $15_2$ write the RAM write data information to address according to the RAM write address assignment information.

The RAM write address assignment information to be supplied to the buffer memories $30_1$ and $30_2$ may be performed by mechanical switch operation or by using binary-coded $2^n$ counter. Otherwise, it may be performed by that the address information and the data information are simultaneously read from RAM or ROM.

When the image for superimpose transmitted from the external memory or microcomputer is received, the terminal RD for the external input control signal is made "L" and output of the external memory or microcomputer is connected as the RAM write data information, whereby the RAM $15_1$ and the RAM $15_2$ release the data bus and the RAM write data information supplied to the data register 31 can be transmitted directly through the serial-parallel conversion circuit 16.

Thus in the vehicle display apparatus of the embodiment of the present invention, a dead angle at surroundings of a vehicle is image-displayed, detection data of various sensors such as distance data between a vehicle and an obstacle and between a vehicle and a man are displayed in superimpose, or at ordinary running state various supervisory data of the vehicle are image-displayed in superimpose.

In the embodiment of the invention shown in FIG. 1, although the image memory circuit for outputting the video signal of superimpose object stored in a memory is composed of the RAM 15, the address counter 12 performing address assignment of the RAM 15, the latch circuit 13, the buffer memory 14, and the serial-parallel convention circuit 16 for converting parallel signals of the RAM 15 into series signals, in order to realize the invention, as shown in a concrete circuit example of the image memory circuit 60 of FIG. 3, circuit constitution may be taken so that image to be superimposed is transmitted from the external memory or microcomputer. Signals transmitted from the external memory or microcomputer may be made data selected by reading output of data scored in the memory corresponding to kind of the sensor and output of the sensor.

Although the image memory circuit 60 for outputting the video signal of superimpose object stored in the memory of the embodiment of the present invention as shown in FIG. 1 and FIG. 3, is composed of the RAM 15, the address counter 12 performing address assignment of the RAM 15, the latch circuit 13, the buffer memory 14, and the serial-parallel conversion circuit 16 for converting parallel signals of the RAM 15 into series signals, in order to realize the invention, RAM or ROM may be used as a memory or the latch circuit for repeating the reading plural times may be omitted.

Further, although the memory reading method is changed by the memory selection switch circuit 11 in the embodiment of the present invention shown in FIG. 1, if selection of the memory unit or address assignment of the memory is performed by the memory selection switch circuit 11 corresponding to kind of the sensor and output of the sensor, data corresponding to state of the vehicle can be displayed on the display means and can be used as steering auxiliary device.

Still further, although output of the nonlinear amplifier circuit 4 is obtained and opening of the diaphragm opening setting means 7 is adjusted in the embodiment of the present invention, opening of the diaphragm of the image pickup camera 1 may be adjusted by using other light receiving element. Any method may be adopted in order to realize the invention. However, if output of the non-linear amplifier circuit 4 is used as shown in the embodiment of the present invention, other light receiving element becomes unnecessary and the image pickup camera 1 need not be provided with the light receiving element, whereby the apparatus becomes compact. Further since signal level of the video signal is discriminated and the opening of the diaphragm is adjusted, the diaphragm opening can be controlled accurately.

What is claimed is:

1. A vehicle display apparatus comprising :
   an image pickup means for converting an object picked up into an output of video signals;
   a diaphragm control circuit for controlling the diaphragm of the image pickup means corresponding to the video output state of the image pickup means;
   diaphragm drive circuit and a diaphragm opening setting means for adjusting the diaphragm opening corresponding to the output of the diaphragm control circuit;
   a non-linear amplifier circuit for performing gamma correction of the output of the image pickup means after amplifying and wave shaping;
   an image memory circuit for providing an output of video signals of a superimposed object stored in a memory;
   a control signal generating circuit for generating scanning signals of the image pickup means, scanning signals of the image memory circuit, and synchronizing signals superposed on the outputs of the non-linear amplifier circuit and the image memory circuit;
   a mixing circuit for superposing the outputs of the image memory circuit and synchronizing signals of the control signal generating circuit on the outputs of the non-linear amplifier circuit into composite video signals; and
   a display means for displaying the composite video signals transmitted from the mixing circuit.

2. A vehicle display apparatus as set forth in claim 1, wherein said image memory circuit comprises a circuit for selectively reading data stored in the memory, said data corresponding to the type of a sensor and the output of the sensor.

3. A vehicle display apparatus according to claim 1, wherein said image memory circuit comprises a RAM, an address counter for assigning the address of the RAM, a latch circuit for holding the value of said address counter for a predetermined time, an address buffer memory which temporarily holds the value of said address counter and uses it for reading the RAM, and a serial-parallel convergent circuit for converting parallel signals of the RAM into the serial signals.

4. A vehicle display apparatus according to claim 3, wherein a memory selective switch circuit is connected to an input port of said control signal generating circuit, for selecting the clock pulses inputted to said address counter, said latch circuit and said buffer memory, for assigning the read address of said RAM and for selecting the clock pulses corresponding to the type of sensor and the output of the sensor.

5. A vehicle display apparatus according to claim 1, further comprising a superimposed switch circuit having a superimpose selection switch for selecting whether said video signals of said superimposed objects are to be superimpose on said outputs of said non-linear amplifier circuit, said superimposed switch circuit being provided between said image memory circuit and said mixing circuit.

* * * * *

UNITED STATES PATENT AND TRADEMARK OFFICE
CERTIFICATE OF CORRECTION

PATENT NO. : 4,740,838

DATED : APRIL 26, 1988

INVENTOR(S) : YAMATO MASE ET AL

It is certified that error appears in the above-identified patent and that said Letters Patent is hereby corrected as shown below:

In the abstract, line 5, delete "pick-up" (both occurrences) and insert therefor --pickup--.

In the abstract, line 6, delete "non-linear" and insert therefor --nonlinear--.

In the abstract, line 8, delete "non-linear" and insert therefor --nonlinear--.

Column 1, line 41, delete "are" and insert therefor --is--.

Column 2, line 3, delete "picked-up" and insert therefor --picked up--.

Column 2, line 9, delete "non-linear" and insert therefor --nonlinear--.

Column 2, line 17, delete "non-linear" and insert therefor --nonlinear--.

Column 2, line 21, delete "non-linear" and insert therefor --nonlinear--.

Column 2, line 25, delete "picked-up" and insert therefor --picked up--.

UNITED STATES PATENT AND TRADEMARK OFFICE
CERTIFICATE OF CORRECTION

PATENT NO. : 4,740,838
DATED : APRIL 26, 1988
INVENTOR(S) : YAMATO MASE ET AL

It is certified that error appears in the above-identified patent and that said Letters Patent is hereby corrected as shown below:

Column 2, line 29, delete "non-linear" and insert therefor --nonlinear--.

Column 2, line 32, delete "non-linear" and insert therefor --nonlinear--.

Column 2, line 34, delete "non-linear" and insert therefor --nonlinear--.

Column 2, line 35, delete "superimpose" and insert therefor --superimposed--.

Column 2, line 41, delete "picked-up" and insert therefor --picked up--.

Column 2, line 54, delete "attend" and insert therefor --attendant--.

Column 3, line 9, delete "picked-up" and insert therefor --picked up--.

Column 3, line 12, delete "know" and insert therefor --known--.

Column 3, line 19, delete "photo-electric" and insert therefor --photoelectric--.

UNITED STATES PATENT AND TRADEMARK OFFICE
CERTIFICATE OF CORRECTION

PATENT NO. : 4,740,838
DATED : APRIL 26, 1988
INVENTOR(S) : YAMATO MASE ET AL

It is certified that error appears in the above-identified patent and that said Letters Patent is hereby corrected as shown below:

Column 3, line 22, delete "waves" and insert therefor --wave--.

Column 3, line 23, delete "non-linear" and insert therefor --nonlinear--.

Column 3, line 29, delete "non-linear" and insert therefor --nonlinear--.

Column 3, line 39, delete "non-linear" and insert therefor --nonlinear--.

Column 3, line 41, delete "cammera" and insert therefor --camera--.

Column 3, line 41, delete "in usual" and insert therefor --usually--.

Column 3, line 42, delete "non-linear" and insert therefor --nonlinear--.

Column 3, line 42, delete "Constitution that" and insert therefor --The--.

Column 3, line 50, delete "superimpose" and insert therefor --superimposed--.

UNITED STATES PATENT AND TRADEMARK OFFICE
CERTIFICATE OF CORRECTION

PATENT NO. : 4,740,838

DATED : APRIL 26, 1988

INVENTOR(S) : YAMATO MASE ET AL

It is certified that error appears in the above-identified patent and that said Letters Patent is hereby corrected as shown below:

Column 3, line 51, delete "non-linear" and insert therefor --nonlinear--.

Column 4, line 15, delete "circuit" (second occurrence).

Column 4, lines 26-27, delete "superimpose" and insert therefor --superimposed--.

Column 4, line 38, delete "4" and insert therefor --14--.

Column 4, line 52, after "signal" insert --is sent--.

Column 4, line 54, delete "non-linear" and insert therefor --nonlinear--.

Column 4, line 64, delete "follow" and insert therefor--follower--.

Column 5, line 17, delete "synchronzing" and insert therefor --synchronizing--.

Column 5, line 24, delete "(high level"" and insert therefor --(high level)"--.

Column 5, line 40, delete "superimposed" and insert therefor --superimpose--.

UNITED STATES PATENT AND TRADEMARK OFFICE
CERTIFICATE OF CORRECTION

PATENT NO. : 4,740,838

DATED : APRIL 26, 1988

INVENTOR(S) : YAMATO MASE ET AL

It is certified that error appears in the above-identified patent and that said Letters Patent is hereby corrected as shown below:

Column 6, line 2, delete "unit" and insert therefor --units--.

Column 6, line 31, delete "counter" and insert therefor --counters--.

Column 6, line 42, delete "in" and insert therefor --is--.

Column 6, line 64, delete "signal, the" and insert therefor --signal. The--.

Column 7, line 6, delete "When the image for superimpose" and insert therefor --When the image, which is to be superimposed,--.

Column 7, line 24, delete "superimpose" and insert therefor --superimposed--.

Column 7, line 28, delete "convention" and insert therefor --conversion--.

Column 7, line 36, delete "scored" and insert therefor --stored--.

Column 7, line 40, delete "superimpose" and insert therefor --superimposed--.

UNITED STATES PATENT AND TRADEMARK OFFICE
CERTIFICATE OF CORRECTION

PATENT NO. : 4,740,838

DATED : APRIL 26, 1988

INVENTOR(S) : YAMATO MASE ET AL

It is certified that error appears in the above-identified patent and that said Letters Patent is hereby corrected as shown below:

Column 7, line 66, delete "non-linear" and insert therefor --nonlinear--.

Column 8, line 15, before "diaphragm" (first occurrence) insert --a--.

Column 8, line 19, delete "non-linear" and insert therefor --nonlinear--.

Column 8, line 29, delete "non-linear" and insert therefor --nonlinear--.

Column 8, line 34, delete "non-linear" and insert therefor --nonlinear--.

Column 8, line 61, delete "superimposed" and insert therefor --superimpose--.

Column 8, line 64, delete "superimpose" and insert therefor --superimposed--.

Column 8, line 64, delete "non-linear" and insert therefor --nonlinear--.

UNITED STATES PATENT AND TRADEMARK OFFICE
CERTIFICATE OF CORRECTION

PATENT NO. : 4,740,838

DATED : APRIL 26, 1988

INVENTOR(S) : YAMATO MASE ET AL

It is certified that error appears in the above-identified patent and that said Letters Patent is hereby corrected as shown below:

Column 8, line 65, delete "superimposed" and insert therefor --superimpose--.

Signed and Sealed this

Twelfth Day of September, 1989

Attest:

DONALD J. QUIGG

*Attesting Officer*  *Commissioner of Patents and Trademarks*